(12) United States Patent
Jeong et al.

(10) Patent No.: US 7,397,519 B2
(45) Date of Patent: Jul. 8, 2008

(54) LIQUID CRYSTAL DISPLAY DEVICE AND METHOD OF FABRICATION THEREOF HAVING DUMMY LAYER AND PLURALITY OF CONTACT HOLES FORMED THROUGH OHMIC CONTACT, SEMICONDUCTIVE AND GATE INSULATING LAYERS

(75) Inventors: Ho Young Jeong, Seoul (KR); Do Young Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 440 days.

(21) Appl. No.: 11/316,901

(22) Filed: Dec. 27, 2005

(65) Prior Publication Data

US 2006/0146219 A1 Jul. 6, 2006

(30) Foreign Application Priority Data

Dec. 30, 2004 (KR) .................. 10-2004-0117220

(51) Int. Cl.
*G02F 1/136* (2006.01)
(52) U.S. Cl. .................. 349/43; 349/46; 349/47; 349/147; 349/141
(58) Field of Classification Search .............. 349/43, 349/46, 47, 147
See application file for complete search history.

(56) References Cited

U.S. PATENT DOCUMENTS 7,184,113 B2 * 2/2007 Baek .................. 349/114
7,362,389 B2 * 4/2008 Yang et al. .................. 349/38
2005/0134755 A1 * 6/2005 Yang et al. .................. 349/43

FOREIGN PATENT DOCUMENTS

CN 1290922 4/2001

* cited by examiner

*Primary Examiner*—David C. Nelms
*Assistant Examiner*—John Heyman
(74) *Attorney, Agent, or Firm*—Morgan, Lewis & Bockius LLP

(57) ABSTRACT

An LCD device includes a data line, a dummy layer, and source and drain electrodes formed on a substrate; an ohmic contact layer formed on the data line, the dummy layer, and the source and drain electrodes; a semiconductor and a gate insulating layers formed on the substrate; a plurality of contact holes formed through the ohmic contact layer, the semiconductor layer, and the gate insulating layer, wherein at least one contact hole exposes the drain electrode; a gate line formed on the gate insulating layer perpendicular to the data line; a gate electrode formed extending from the gate line, the gate electrode positioned between the source and drain electrodes; pixel regions defined by intersections of the gate and data lines; and a pixel electrode connected with the drain electrode through another contact hole, wherein the pixel electrode is formed of a same material as the gate line.

25 Claims, 12 Drawing Sheets

LIQUID CRYSTAL DISPLAY DEVICE AND METHOD OF FABRICATION THEREOF HAVING DUMMY LAYER AND PLURALITY OF CONTACT HOLES FORMED THROUGH OHMIC CONTACT, SEMICONDUCTIVE AND GATE INSULATING LAYERS

This application claims the benefit of the Korean Patent Application No. 2004-117220 filed on Dec. 30, 2004, which is hereby incorporated by reference.

BACKGROUND OF THE INVENTION

1. Field of the Invention

The present invention relates to a liquid crystal display (LCD) device, and more particularly, to an LCD device and a method for fabricating the same, to obtain a simplified fabricating process by forming a gate electrode and a pixel electrode from the same material.

2. Discussion of the Related Art

Recently, many efforts have been made to research and develop various types of flat display devices, such as a liquid crystal display (LCD), plasma display panel (PDP), electroluminescent display (ELD), and vacuum fluorescent display (VFD). Today, some of the flat display devices are already used in the various applications. Among the types of flat display devices, liquid crystal display (LCD) devices have been widely used because of the advantageous characteristics of thin size, light weight, and low power consumption. In addition, the LCD devices provide a popular substitute to replace a Cathode Ray Tube (CRT). Furthermore, some LCD devices, for example, an LCD TV and mobile type LCD devices such as a display for a notebook computer, are developed to receive and display broadcasting signals.

However, despite the various technical advancements in developing the LCD technology, research in enhancing the picture quality of the LCD device has been, in some respects, lacking the attention as compared to other features and advantages of the LCD device. To use the LCD devices in various fields as a general display, the key to developing the LCD devices depends on whether the LCD devices can realize a high quality picture, such as high resolution and high luminance with a large-sized screen, while still maintaining lightness in weight, thin size, and low power consumption.

In general, the LCD device includes an LCD panel for displaying an image and a driver for supplying a driving signal to the LCD panel. In addition, the LCD panel includes first and second substrates bonded to each other. A liquid crystal layer is interposed in a cell gap between the first and second substrates. The first substrate (referred to as a TFT array substrate) includes a plurality of gate lines arranged in a first direction at fixed intervals, a plurality of data lines arranged in a second direction perpendicular to the first direction at fixed intervals, a plurality of pixel electrodes arranged in a matrix-type configuration within the pixel regions defined by the gate and data lines, and a plurality of thin film transistors formed at appropriate intersection of the gate line and data line, in which each TFT transistor transmits signals from the data lines to the pixel electrodes in accordance with the signals supplied to the gate lines.

The second substrate (referred to as a color filter array substrate) includes a black matrix layer that prevents a light leakage from corresponding portions of the first substrate except at the pixel regions, an R/G/B color filter layer for displaying various colors, and a common electrode for producing an image. Alignment layers are respectively formed on the opposing surfaces of the first and second substrates, wherein the alignment layers are rubbed to align the liquid crystal layer. Then, the first and second substrates are bonded together by a sealant, and liquid crystal is injected between the first and second substrates. In the meantime, the first and second substrates are fabricated by photolithography using several masks, for example, a 5-mask process. Instead of the 5-mask process, a 4-mask process using a diffraction exposure method is gaining popularity for improving the TFT transistor yield.

A method for fabricating an LCD device using a diffraction exposure according to the related art will be described with reference to FIGS. 1A to 1G. As shown in FIG. 1A, a substrate 40 including a plurality of pixel regions is prepared. Then, a metal layer is deposited on an entire surface of the substrate 40, and then selectively patterned by photolithography. Thus, a gate line (not shown) and a gate electrode GE are formed in each of the pixel regions (first mask).

Referring to FIG. 1B, a silicon oxide layer SiOx or silicon nitride layer SiNx is formed on the entire surface of the substrate 40 including the gate electrode GE. Then, a semiconductor material 41 of genuine amorphous silicon, an impurity semiconductor material of amorphous silicon having impurity ions, and a metal layer 43 of chrome or molybdenum are deposited in sequence.

As shown in FIG. 1C, a photoresist PR layer is disposed on an entire surface of the metal layer 43, and then selectively exposed and developed using a diffraction mask M. At this time, the diffraction mask M includes an open part m1 penetrating light, a closed part m2 cutting off the light, and a diffraction part m3 comprised of a slit penetrating some of the light and cutting off some of the light. The diffraction part m3 corresponds to a channel region of the thin film transistor.

When performing the exposure and development process to the photoresist PR by irradiating ultraviolet ray through the diffraction mask M, the photoresist PR corresponding to the open part m1 is removed, the photoresist PR corresponding to the closed part m2 remains as it is, and the photoresist PR corresponding to the diffraction part m3 is removed at a predetermined thickness (second mask). Generally, the photoresist PR corresponding to the diffraction part m3 will result in reducing the original photoresist PR thickness in half.

After that, the exposed metal layer 43, the impurity semiconductor material of amorphous silicon with impurity 42, and the semiconductor material of genuine amorphous silicon 41 are removed by an etching process using the patterned photoresist PR as a mask. As a result, a semiconductor layer 41a, an ohmic contact layer 42a, and a source/drain metal layer 44 are formed on the gate insulating layer GI above the gate electrode GE.

Then, as shown in FIG. 1D, the entire surface of the patterned photoresist PR is ashed by plasma. At this time, the photoresist PR corresponding to the diffraction part m3 is removed because it has less thickness compared to the other parts of the photoresist PR. Accordingly, the source/drain metal layer 44 corresponding to the diffraction part m3 is exposed.

As shown in FIG. 1E, the exposed source/drain metal layer 44, and the ohmic contact layer formed under the source/drain metal layer 44 are simultaneously etched by using the remaining photoresist PR as the mask. Accordingly, a channel region is formed by exposing the portion of first semiconductor layer 41a. At this time, because of a gap formed on the source/drain metal layer 44 within the channel region, it is possible to form a source electrode SE overlapping one edge of the semiconductor layer 41a, and a drain electrode DE overlapping the other edge of the semiconductor layer 41a.

As shown in FIG. 1F, a passivation layer of organic insulating layer is deposited on the entire surface of the substrate 40 including the source electrode SE and the drain electrode DE, and then selectively patterned by photolithography, thereby forming a drain contact hole C1 which exposes some of the drain electrode DE (third mask).

As shown in FIG. 1G, a transparent conductive layer is deposited on the entire surface of the substrate 40 including the passivation layer 45, wherein the transparent conductive layer is electrically connected with the drain electrode DE through the drain contact hole C1. Then, the transparent conductive layer is patterned by photolithography, whereby a pixel electrode 46 is formed in the pixel region P (fourth mask).

However, the related art method using the 4-mask process has the following disadvantages. In the related art method using the 4-mask process, the production yield is still low. In addition, when using the 4-mask process, it is difficult to obtain an etching uniformity.

SUMMARY OF THE INVENTION

Accordingly, the present invention is directed to an LCD device and a method for fabricating the same that substantially obviate one or more problems due to limitations and disadvantages of the related art.

An object of the present invention is to provide an LCD device and a method for fabricating the same, to obtain the simplified fabricating process to promote the etching uniformity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device includes a data line, a dummy layer, and source and drain electrodes formed on a substrate; an ohmic contact layer formed on the data line, the dummy layer, and the source and drain electrodes; a semiconductor layer and a gate insulating layer formed on the substrate; a plurality of contact holes formed through the ohmic contact layer, the semiconductor layer, and the gate insulating layer, wherein at least one contact hole exposes the drain electrode; a gate line formed on the gate insulating layer perpendicular to the data line; a gate electrode formed extending from the gate line, wherein the gate electrode is positioned between the source electrode and the drain electrode; pixel regions defined by intersections of the gate lines and the data lines; and a pixel electrode connected with the drain electrode through another contact hole in the pixel region, wherein the pixel electrode is formed of a same material as the gate line.

In another aspect of the present invention, an LCD device includes a data line, first dummy layer, second dummy layer, and source and drain electrodes formed on a substrate; an ohmic contact layer formed on the data line, the first dummy layer, the second dummy layer, and the source and drain electrodes; a semiconductor layer and a gate insulating layer formed on the substrate; a plurality of contact holes formed through the ohmic contact layer, semiconductor layer, and the gate insulating layer, wherein at least one contact hole exposes the drain electrode; a gate line formed on the gate insulating layer perpendicular to the data line; a gate electrode formed extending from the gate line, wherein the gate electrode is positioned between the source electrode and the drain electrode; pixel regions defined by intersections of the gate lines and the date lines; a pixel electrode formed of a same material as the gate line in the pixel region, the pixel electrode being electrically connected with the drain electrode through another contact hole, wherein the pixel electrode has a first portion and a plurality of second portions; a common line formed of the same material as the gate line; a common electrode formed of the same material as the gate line in the pixel region, wherein the common electrode has a plurality of second portions such that one second portion of the common electrode is positioned next to one second portion of the pixel electrode.

In another aspect of the present invention, a method for fabricating an LCD device includes forming a data line, a dummy layer, and source and drain electrodes on a substrate; forming an ohmic contact layer on the data line, the dummy layer, and the source and drain electrode; sequentially depositing a semiconductor layer and a gate insulating layer on an entire surface of the substrate including the source and drain electrodes, dummy layer, and the data line; forming a plurality of contact holes through the ohmic contact layer, the semiconductor layer, and the gate insulating layer, wherein a first contact hole exposes the drain electrode and at least one second contact hole exposes the dummy layer; forming a gate line on the gate insulating layer perpendicular to the data line, wherein a gate electrode is formed extending from the gate line and the gate line is electrically connected with the dummy layer through the at least one second contact hole; and forming a pixel electrode which connects with the drain electrode through the first contact hole, wherein the pixel electrode is formed of a same material as the gate line.

In another aspect of the present invention, a method for fabricating an LCD device includes A method for fabricating an LCD device includes forming source and drain electrodes, a data line, and first and second dummy layers on a substrate; forming an ohmic contact layer on the data line, the source and drain electrodes, and the first and second dummy layers; sequentially forming a semiconductor layer and a gate insulating layer on an entire surface of the substrate including the source and drain electrodes, the data line and the first and second dummy layers; forming a plurality of contact holes through the ohmic contact layer, the semiconductor layer, and the gate insulating layer, wherein first contact hole exposing the drain electrode, and at least one second contact hole exposing the first dummy layer and another second hole exposes the second dummy layer; forming a gate line on the gate insulating layer perpendicular to the data line, wherein a gate electrode is formed extending from the gate line and the gate line is electrically connected with the first dummy layer through the at least one second contact hole; forming a pixel electrode having a first portion and a plurality of second portions, the pixel electrode connected with the drain electrode through the first contact hole, and the pixel electrode is formed of a same material as the gate line; forming a common electrode having a plurality of second portions, the common electrode formed of the same material as the gate line, wherein one second portion of the common electrode is positioned next to one second portion of the pixel electrodes; and forming a common line which is electrically connected with the second dummy layer through another second contact hole to apply a common voltage to the common electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device and a method for fabricating the same according to the preferred embodiments of the present invention will be described with reference to the accompanying drawings.

Figure 1A:
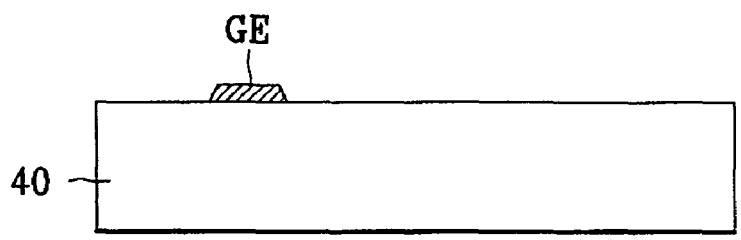
FIGS. 1A to 1G are cross sectional views showing a related art method for fabricating an LCD device using a diffraction exposure.
Figure 1B:
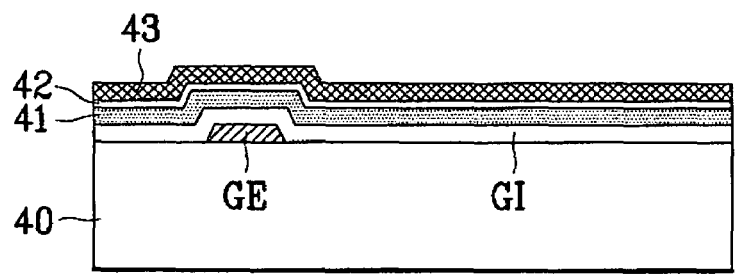
Figure 1C:
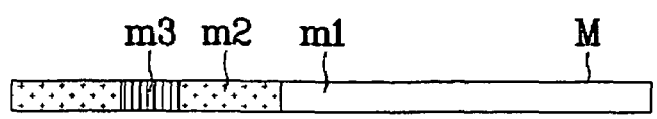
Figure 1C:
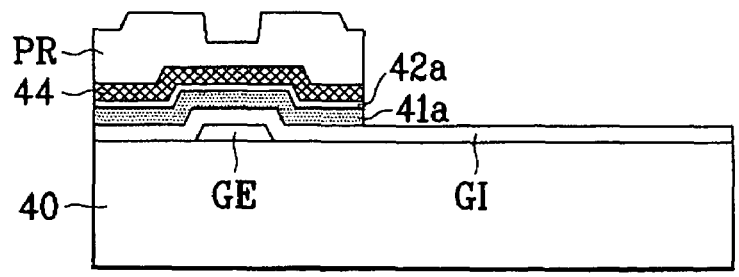
Figure 1D:
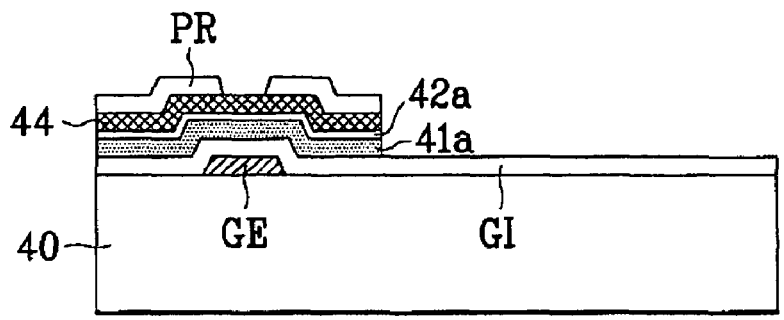
Figure 1E:
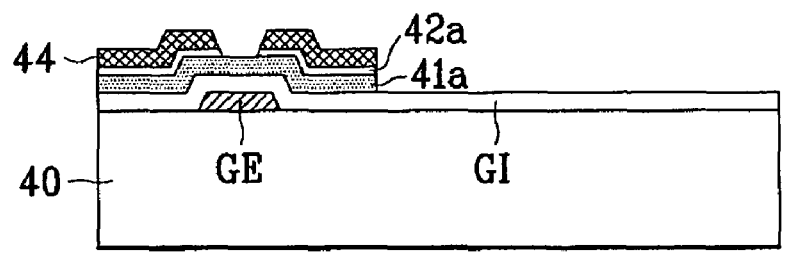
Figure 1F:
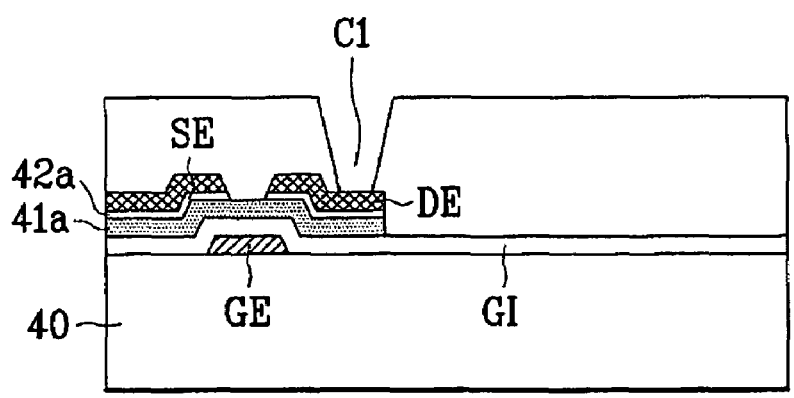
Figure 1G:
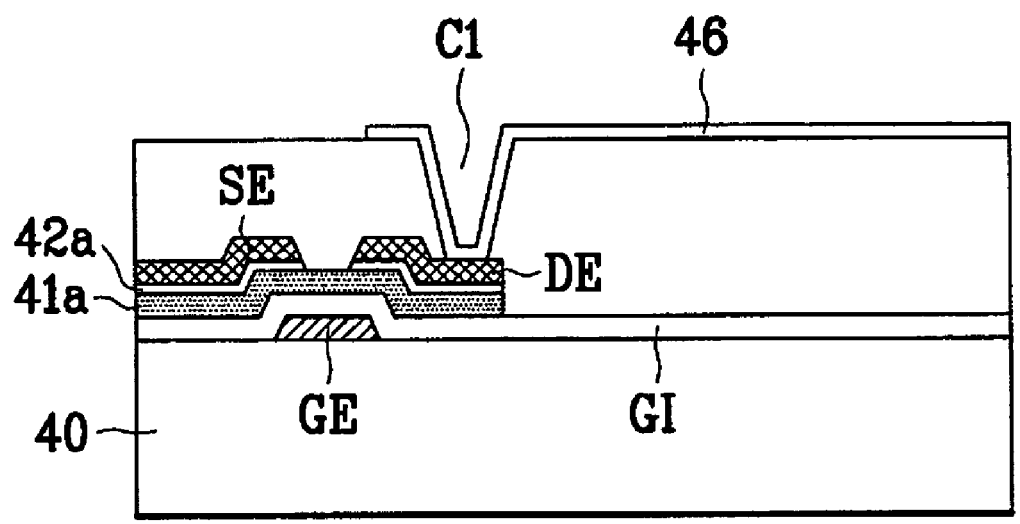
Figure 2:
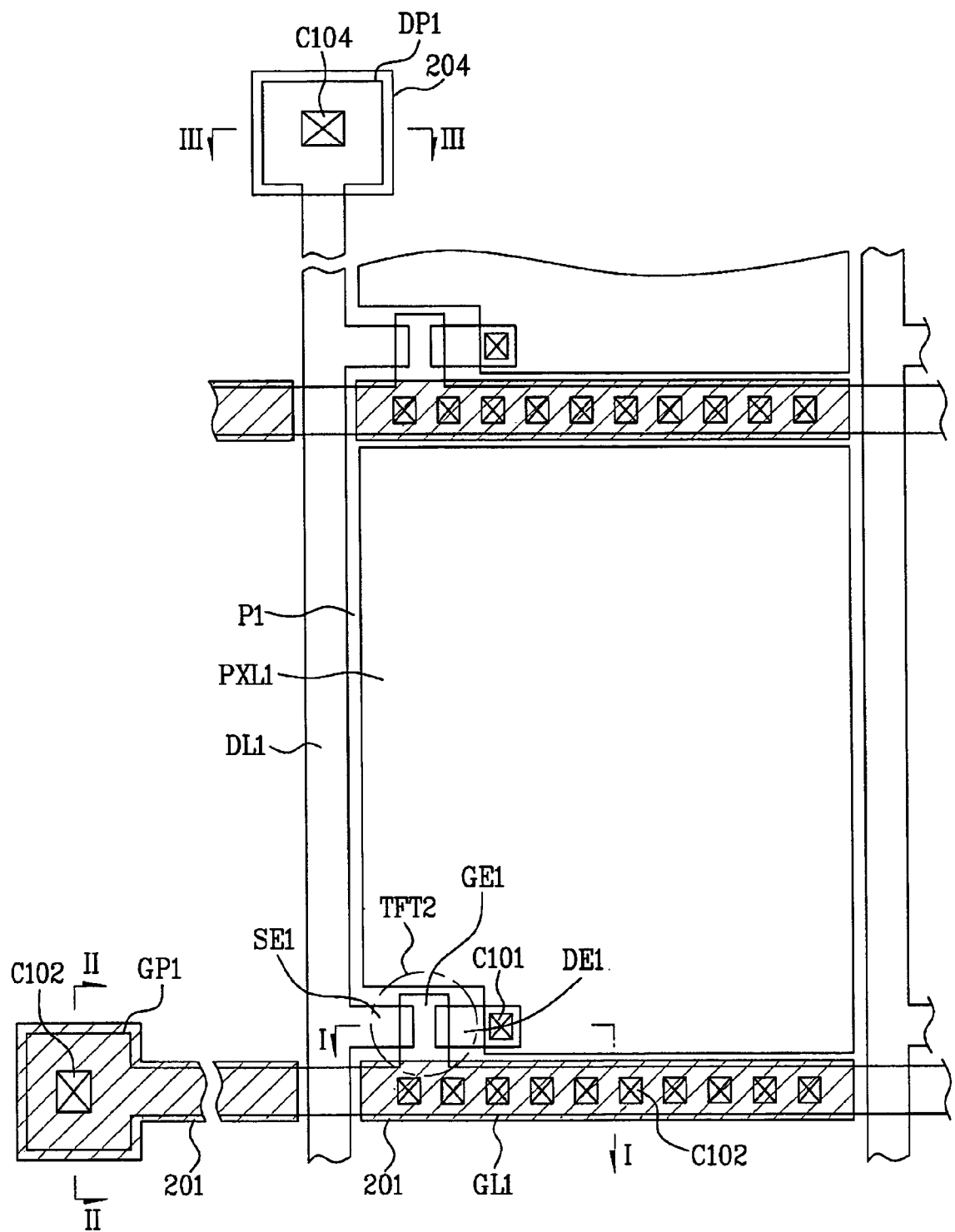
FIG. 2 is a schematic view of a lower substrate of an LCD device according to a first exemplary embodiment of the present invention.

FIG. 2 is a schematic view showing a lower substrate of an LCD device according to the first exemplary embodiment of the present invention. As shown in FIG. 2, a lower substrate of an LCD device includes a plurality of gate lines GL1 and a plurality of data lines DL1. Each of the gate lines GL1 is formed perpendicular to each of the data lines DL1, thereby defining a unit pixel region P1. Then, a pixel electrode PXL1 is formed in the pixel region P1, such that the pixel electrode is formed of the same material as the gate line GL1.

Also, a thin film transistor TFT2 is formed at an intersection of the gate line GL1 and the data line DL1. In detail, the thin film transistor TFT2 includes a gate electrode GE1, source and drain electrodes SE1 and DE1, and a semiconductor layer (not shown). The gate electrode GE1 is extended from the gate line GL1 to the pixel region P1, and the source and drain electrodes SE1 and DE1 are extended from the data line DL1 to the pixel region P1. As the source and drain electrodes SE1 and DE1 are separated from each other, the portions of source and drain electrodes SE1 and DE are overlapped with edges of the gate electrode GE1.

In addition, a gate pad electrode GP1 is formed at one end of the gate line GL1, wherein size of the gate pad electrode GP1 is larger than the gate line GL1. Also, a data pad electrode DP1 is formed at one end of the data line DL1, wherein size of the data pad electrode DP1 is larger than the data line DL1. Furthermore, a data pad terminal 204 is formed over the data pad electrode DP1, wherein the data pad terminal 204 is connected with the data pad electrode DP1 through a data pad contact hole C104.

In the LCD device according to the first exemplary embodiment of the present invention, as explained above, the gate line GL1 is formed of the same material as the pixel electrode PXL1, thereby decreasing the number of masks used. To prevent the decrease of light-transmittance ratio in the pixel region P1, the gate line GL1 and the pixel electrode PXL1 are formed of transparent conductive layers such as ITO (Indium Tin Oxide). The transparent conductive layers are suitable for the pixel electrode PXL1 since the transparent conductive layers have the great light-transmittance ratio. However, the transparent conductive layers have electric resistance elements. Thus, typically the transparent conductive layers are unsuitable for the gate line GL1. To solve this problem, a dummy layer 201 of a metal material is additionally formed below the gate line GL1, wherein the dummy layer 201 is in contact with the gate line GL1. That is, when a thickness of the gate line GL1 increases, it is possible to decrease the electric resistance elements in the transparent conductive layers.

The dummy layer 201 is formed of the same material as the data line DL1, for example, the metal material. The dummy layer 201 is electrically connected with the gate line GL1 through a dummy contact hole C102. As shown in FIG. 2, the dummy layer 201 is formed selectively avoiding the intersection of the gate line GL1 and the data line DL1. Accordingly, the dummy layer 201 includes portions of discontinuity. Also, the dummy layer 201 is formed in the same shape as a gate pad electrode GP1 and disposed below the gate pad electrode GP1.

The LCD device according to the first exemplary embodiment of the present invention includes an upper substrate and a liquid crystal layer. The upper substrate is positioned opposite to the lower substrate, and the liquid crystal layer is formed between the lower and upper substrates. The upper substrate includes a black matrix layer that prevents a light leakage from the portions of the lower substrate except at the pixel regions, an R/G/B color filter layer for displaying various colors, and a common electrode for representing images. The LCD device according to the first exemplary embodiment is driven by an electric field, which is formed vertically between the pixel electrode PXL1 of the lower substrate and the common electrode of the upper substrate.

Figure 3A:
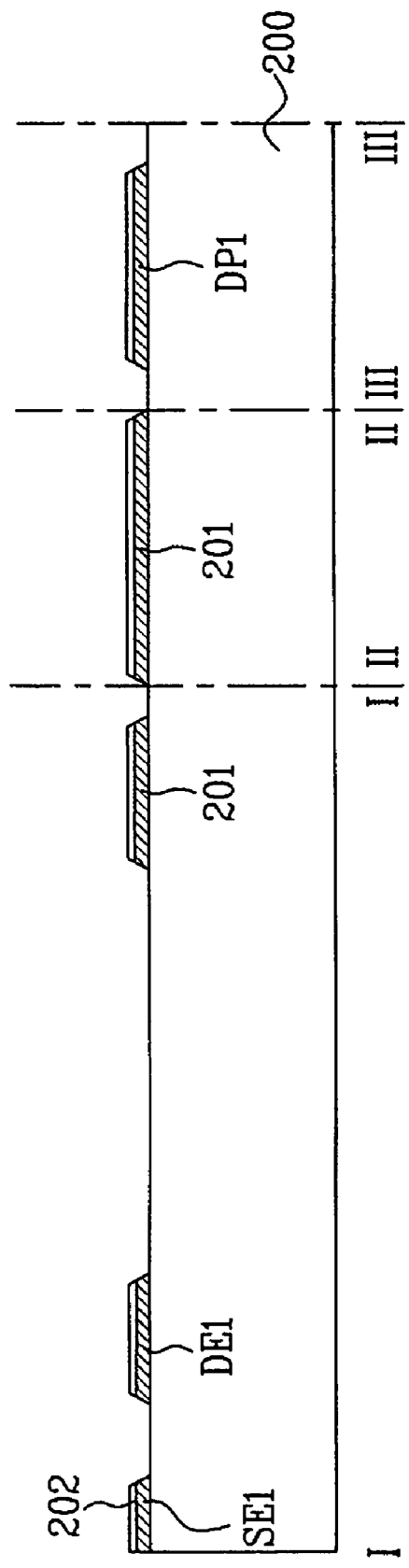
FIGS. 3A to 3C are cross sectional views taken along lines I-I', II-II' and III-III' of FIG. 2, showing a method for fabricating an LCD device according to a first exemplary embodiment of the present invention.
Figure 3B:
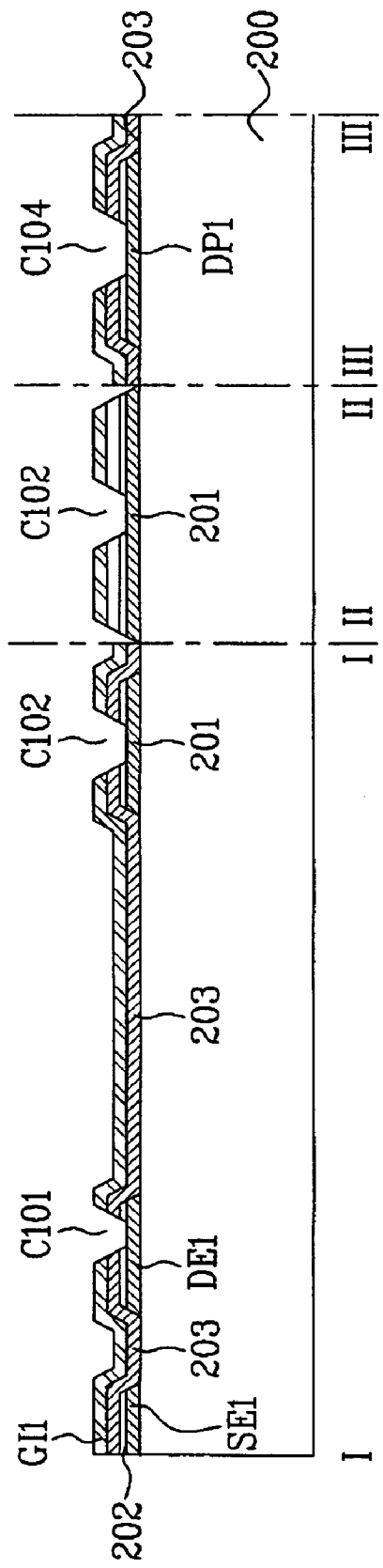
Figure 3C:
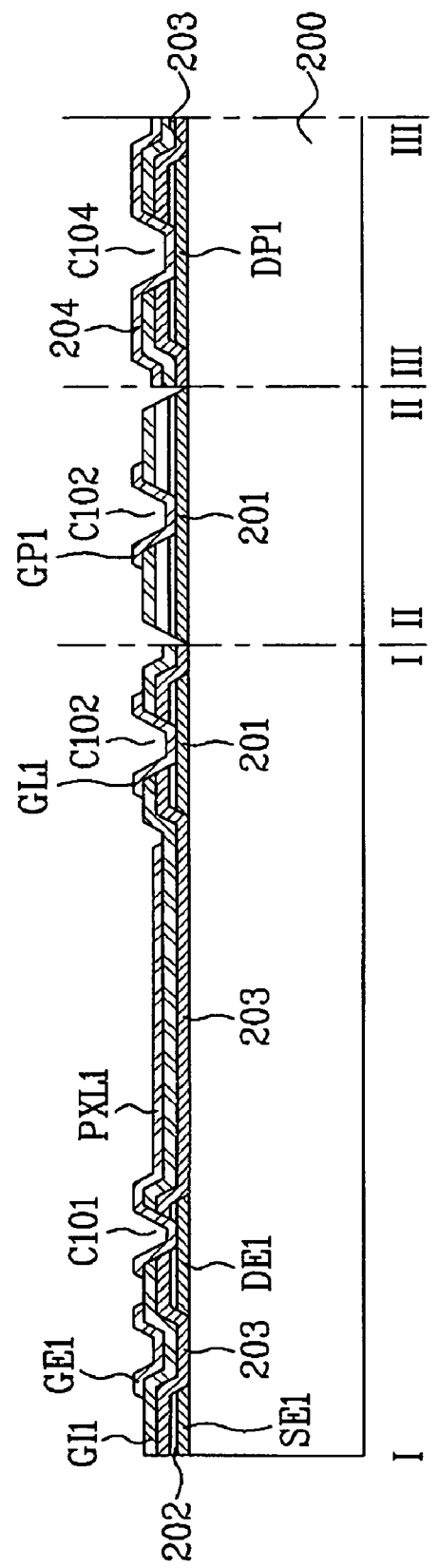

A method for fabricating the LCD device according to the first exemplary embodiment of the present invention will be described with reference to the accompanying drawings. FIGS. 3A to 3C are cross sectional views taken along lines I-I', II-II' and III-III' of FIG. 2, illustrating a method for fabricating an LCD device according to the first exemplary embodiment of the present invention. As shown in FIG. 3A, a metal layer, for example, chrome or molybdenum, is deposited on an entire surface of a lower substrate 200. Then, an impurity semiconductor layer is deposited on the entire surface of the lower substrate 200 including the metal layer.

After that, the metal layer and the impurity semiconductor layer are simultaneously patterned by photolithography, thereby forming a data line DL1 (shown in FIG. 2), a source electrode SE1, a drain electrode DE1, a data pad electrode DP1 and a dummy layer 201. At the same time, an ohmic contact layer 202 is formed on each of the above patterns; the data line DL1, the source electrode SE1, the drain electrode DE1, the data pad electrode DP1 and the dummy layer 201 (first mask).

The data line DL1 is formed in one direction on the lower substrate 200, and the source electrode SE1 is extended from the data line DL1 to a pixel region P1. The drain electrode DE1 is formed at a predetermined interval from the source electrode SE1 in the pixel region P1. Also, the data pad electrode DP1 is formed at one end of the data line DL1. The dummy layer 201 is formed in a portion corresponding to the gate line GL1 and a gate pad electrode. The dummy layer 201 is formed in perpendicular to the data line DP1, in which the dummy layer 201 is selectively formed avoiding the intersection of gate line GL1 with the data line DP1.

As shown in FIG. 3B, a semiconductor layer 203 of genuine amorphous silicon and a gate insulating layer GI1 of silicon oxide SiOx or silicon nitride SiNx are deposited on the entire surface of the lower substrate 200 including the data line DL1, the source electrode SE1, the drain electrode DE1, the data pad electrode DP1 and the dummy layer 201. Then, the gate insulating layer GI1, the semiconductor layer 203 and the ohmic contact layer 202 are selectively etched, thereby forming a drain contact hole C101, a data pad contact hole C104 and a dummy contact hole C102 (second mask). At this time, the drain contact hole C101 exposes the drain electrode DE1, the data pad contact hole C104 exposes the data pad electrode DP1, and the dummy contact hole C102 exposes the dummy layer 201.

Referring to FIG. 3C, a transparent conductive layer of ITO (Indium Tin Oxide) is deposited on the entire surface of the lower substrate 200 including the gate insulating layer GI1, and then patterned by photolithography, thereby forming the gate line GL1, a gate electrode GE1, the gate pad electrode GP1, a data pad terminal 204 and a pixel electrode PXL1 (third mask). At this time, the gate line GL1 is formed perpendicular to the data line DL1, and the gate line GL1 is formed on the gate insulating layer GI1. The gate electrode GE1 is extended from the gate line GL1 to the pixel region P1. In this case, the gate electrode GE1 is formed on the gate insulating layer GI1, wherein edges of the gate electrode GE1 are overlapping the predetermined portions of the source and drain electrodes SE1 and DE1. In addition, the gate pad electrode GP1 is formed at one end of the gate line GL1. Also, the gate line GL1 is connected with the gate pad electrode GP1 through the dummy layer 201 and the dummy contact hole C102. In addition, the gate pad electrode GP1 is formed of a transparent conductive layer.

Thus, there is no need to provide an additional gate pad terminal connected with the gate pad electrode GP1. Also, the data pad terminal 204 is electrically connected with the data pad electrode DP1 through the data pad contact hole C104. The data pad terminal 204 is identical in shape to the data pad electrode DP1. The pixel electrode PXL1 is electrically connected with the drain electrode DE1 through the drain contact hole C101, and the pixel electrode PXL1 is formed on the gate insulating layer GI1 within the pixel region P1.

To minimize electric resistance elements of the gate line GL1, it is important to maximize a contact area between the gate line GL1 and the dummy layer 201. Accordingly, the dummy contact hole C102 is formed at a maximum size within a permitted limit in accordance with the line width and length of the gate line GL1. As shown in FIG. 2, it is preferable to maximize the number of dummy contact holes C102 within a permitted limit. Although not shown, the lower substrate 200 is positioned at a predetermined interval from an upper substrate, and a liquid crystal layer is interposed between the lower and upper substrates. The LCD device according to the first exemplary embodiment of the present invention is formed in a TN (Twisted Nematic) mode.

In the second exemplary embodiment of the present invention, the LCD devices are formed in an IPS (In-Plane Switching) mode, in which both pixel and common electrodes are formed on a lower substrate. That is, the ISP mode LCD formed according to the second exemplary embodiment of the present invention is driven with a transverse electric field formed between the pixel electrode and the common electrode. Hereinafter, an LCD device according to the second exemplary embodiment of the present invention will be described with reference to the accompanying drawings.

Figure 4:
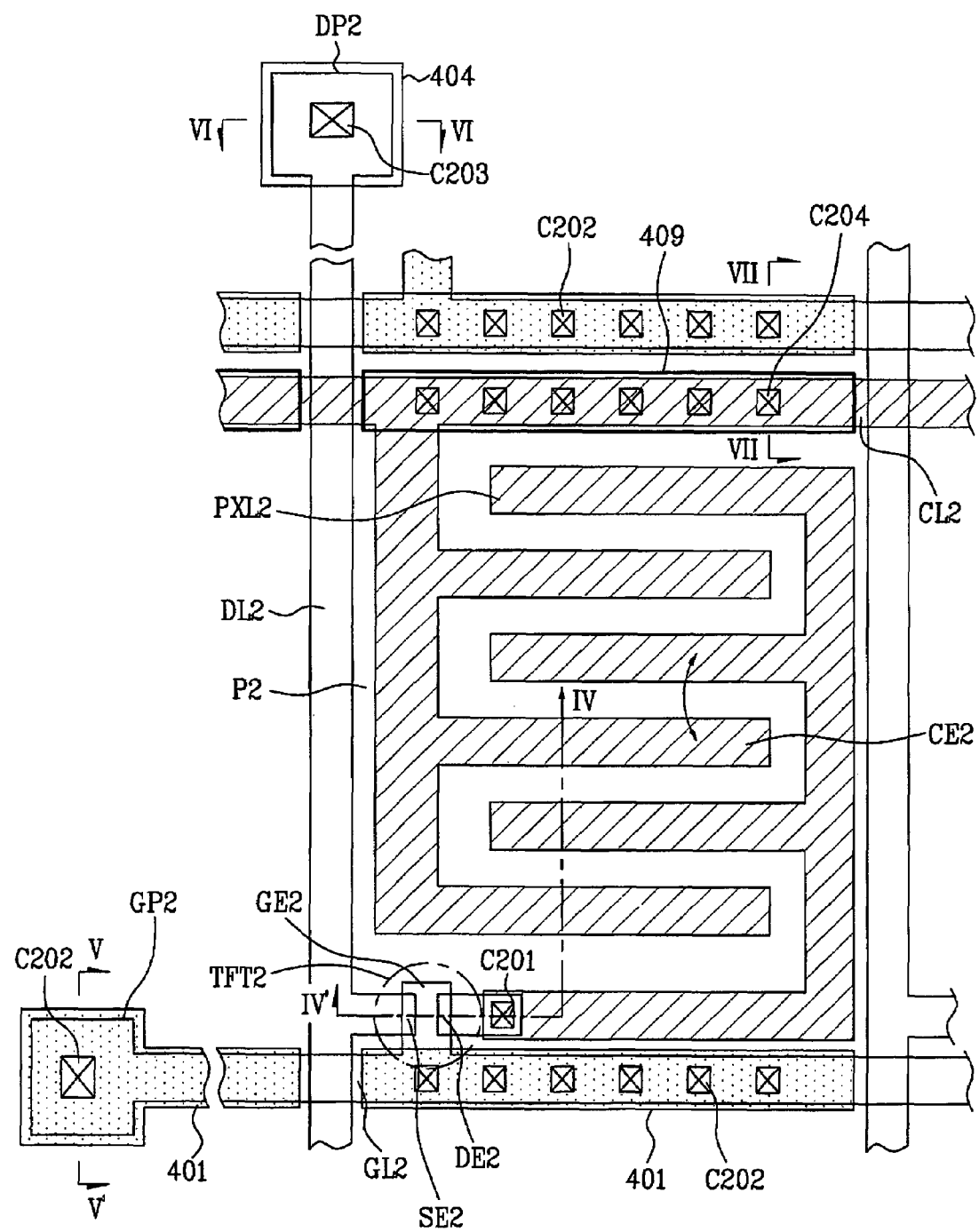
FIG. 4 is a schematic view of a lower substrate of an LCD device according to an second exemplary embodiment of the present invention.

FIG. 4 is a schematic view showing a lower substrate of an LCD device according to the second exemplary embodiment of the present invention. As shown in FIG. 4, a lower substrate of an LCD device according to the second exemplary embodiment of the present invention includes a plurality of gate lines GL2 and a plurality of data lines DL2. Each of the gate lines GL2 is perpendicular to each of the data lines DL2, thereby defining a unit pixel region P2.

Then, a thin film transistor TFT2 is formed at an intersection of the gate line GL2 and the data line DL2. In detail, the thin film transistor TFT2 includes a gate electrode GE2, source and drain electrodes SE2 and DE2, and a semiconductor layer (not shown). The gate electrode GE2 is extended from the gate line GL2 to the pixel region P2, and the source and drain electrodes SE2 and DE2 are extended from the data line DL2 to the pixel region P2. The source and drain electrodes SE2 and DE2 are separated from each other by a gap, and the portions of source and drain electrodes SE1 and DE2 are overlapped with edges of the gate electrode GE2.

A pixel electrode PXL2 having the comb-shape is formed in the pixel region P2, wherein one of the teeth portions of the pixel electrode PXL2 is formed connecting to a drain electrode DE2 through a drain contact hole C201. The pixel electrode PXL2 is formed of the same material as the gate line GL2 and the teeth portions of the pixel electrode PXL2 are formed in parallel with the gate line GL2, while the handle portion of the pixel electrode PXL2 is formed parallel to the data line DL2.

In each pixel region P2, a common electrode CE2 is also formed in a comb-shape. Accordingly, teeth portions of the common electrode CE2 are formed at fixed intervals in one direction, wherein each tooth portion of the common electrode CE2 is positioned between the teeth portions of the pixel electrode PXL2. The common electrode CE2 is formed of the same material as the gate line GL2, and the teeth portions of the common electrode CE2 are formed parallel to the gate line GL2. The common line CL2 also is formed of the same material as the gate line GL2. In addition, handle portion of the common electrode CE2 is formed extending from the common line CL2. As shown in FIG. 4, the common line CL2 is formed across the pixel regions P2 arranged in a horizontal direction, that is, the common line CL2 is perpendicular to the data line DL2.

In addition, a gate pad electrode GP2 is formed at one end of the gate line GL2, wherein size of the gate pad electrode GP2 is larger than the gate line DL2. Also, a data pad electrode DP2 is formed at one end of the data line DL2, wherein size of the data pad electrode DP2 is larger than the data line DL2. Furthermore, a data pad terminal 404 is formed over the data pad electrode DP2, wherein the data pad terminal 404 is connected with the data pad electrode DP2 through a data pad contact hole C203.

To decrease the number of masks used, the gate line GL2, the pixel electrode PXL2, the common electrode CE2, and the common line CL2 are formed of the same material in the LCD device according to the second exemplary embodiment of the present invention. In this case, the material for the gate line GL2, the pixel electrode PXL2, the common electrode CE2, and the common line CL2 includes a transparent conductive material such as ITO (Indium Tin Oxide). Thus it is possible to prevent lowering of the light-transmittance ratio in the pixel region P2. While the transparent conductive layer has the great light-transmittance ratio, which is suitable for the pixel electrode PXL2, however, the transparent conductive layer has a higher electric resistance than a general metal material, such that the transparent conductive layer is generally unsuitable for the gate line GL2 and the common line CL2.

In the LCD device according to the second exemplary embodiment of the present invention, a first dummy layer 401 of metal material is additionally formed, wherein the first dummy layer 401 is connected with the gate line GL2 of the transparent conductive layer. Thus, it is possible to increase the thickness of the gate line GL2, thereby decreasing the electric resistance elements of the gate line GL2. Also, a second dummy layer 409 of metal material is formed, which is connected with the common line CL2 of the transparent conductive layer. Thus, it is possible to increase the thickness of the common line CL2 and decrease the electric resistance elements of the common line CL2.

In the LCD device according to the second exemplary embodiment of the present invention, an upper substrate (not shown) is provided opposite to the lower substrate, and a liquid crystal layer is interposed between the lower and upper substrates. Although not shown, the upper substrate includes a black matrix layer that prevents a light leakage from portions of the lower substrate except at the pixel regions, an RIG/B color filter layer for displaying various colors, and an overcoat layer that supports the flatness of the color filter layer and prevents the liquid crystal layer from being contaminated due to pigments of the color filter layer.

In the LCD device according to the second exemplary embodiment of the present invention, the teeth portions of the pixel electrode PXL2 and the teeth portions of the common electrode CE2 are formed in parallel with the gate lines GL2, in which an electric field is generated in an arrow direction of FIG. 4.

Figure 5A:
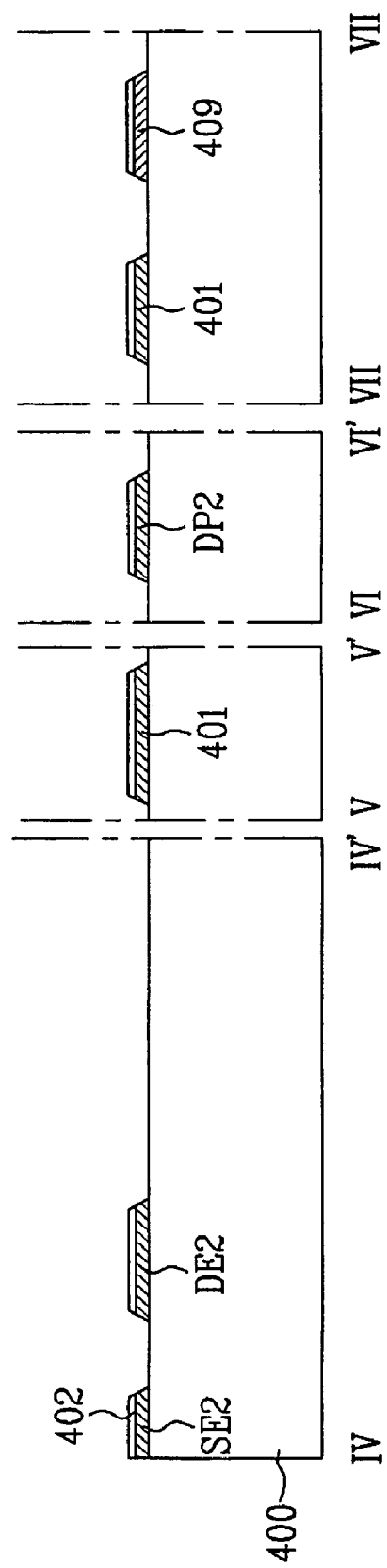
FIGS. 5A to 5C are cross sectional views taken along lines IV-IV', V-V', VI-VI' and VII-VII' of FIG. 4, showing a method for fabricating an LCD device according to the second exemplary embodiment of the present invention.
Figure 5B:
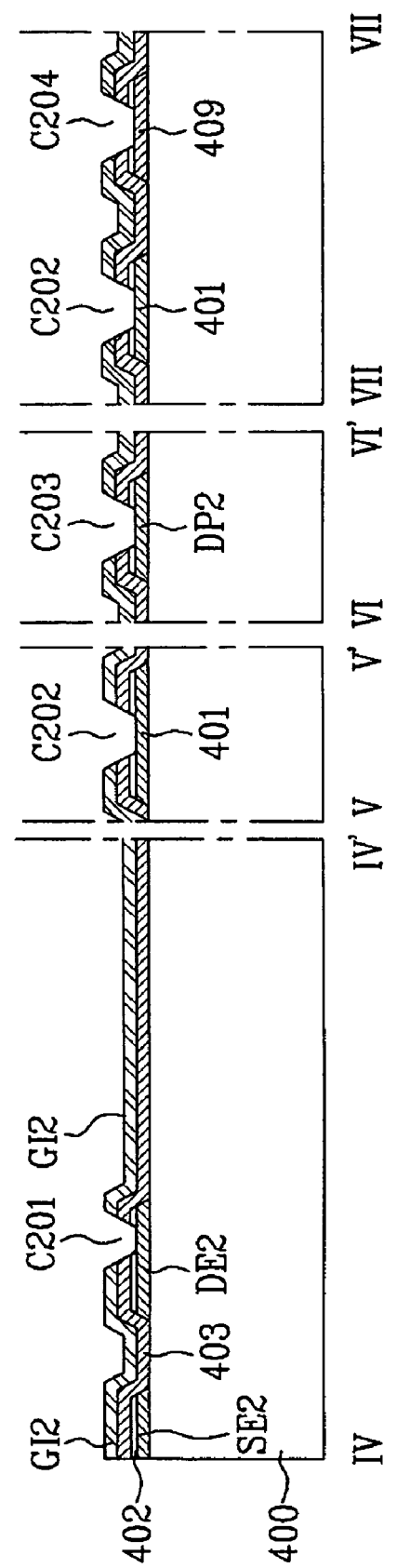
Figure 5C:
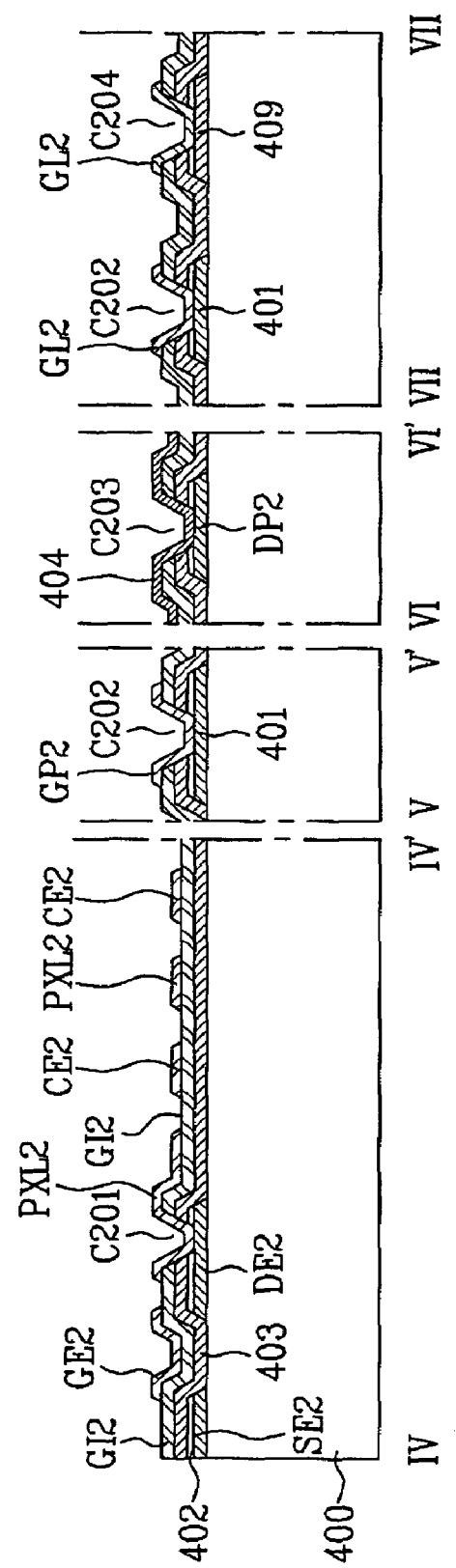

A method for fabricating the LCD device according to the second exemplary embodiment of the present invention will be described with reference to the accompanying drawings. FIGS. 5A to 5C are cross sectional views taken along lines IV-IV', V-V', VI-VI' and VII-VII' of FIG. 4, showing a method for fabricating the LCD device according to the second exemplary embodiment of the present invention.

As shown in FIG. 5A, a metal layer, for example, chrome or molybdenum, is deposited on an entire surface of the lower substrate 400. Then, an impurity semiconductor layer is deposited on the entire surface of the lower substrate 400 including the metal layer. After that, the metal layer and the impurity semiconductor layer are simultaneously patterned by photolithography, thereby forming a data line DL2 (not shown), a source electrode SE2, a drain electrode DE2, a data pad electrode DP2, a first dummy layer 401 and a second dummy layer 409. At the same time, an ohmic contact layer 402 is formed on each of the above patterns including the data line DL2, the source electrode SE2, the drain electrode DE2, the data pad electrode DP2, the first dummy layer 401 and the second dummy layer 409 (first mask). The data line DL2 is formed in one direction on the lower substrate 400, and the source electrode SE2 is extended from the data line DL2 to the pixel region P2. The drain electrode DE2 is formed at a predetermined interval from the source electrode SE2 in the pixel region P2. Also, the data pad electrode DP2 is formed at one end of the data line DL2.

The first dummy layer 401 is formed at a portion corresponding to the gate line GL2 and a gate pad electrode GP2 and the first dummy layer 401 is formed of the same material as the data line DL2. The second dummy layer 409 is formed at a portion corresponding to the common line CL2 and the second dummy layer 409 is also formed of the same material as the data line DL2. As shown in FIG. 4, the first and second dummy layers 401 and 409 are formed having portions of discontinuity at the intersections of the data line DL2 and the gate line GL2.

As mentioned above, the ohmic contact layer 402 is formed on each of the above patterns; the data line DL2, the source electrode SE2, the drain electrode DE2, the data pad electrode DP2, the first dummy layer 401 and the second dummy layer 409. In this case, the data line DL2, the source electrode SE2 and the data pad electrode DP2 are formed as one body, whereby the ohmic contact layers 402 formed on the data line DL2 and the source electrode SE2 are formed as one body.

The ohmic contact layer 402 formed on the first dummy layer 401 and the ohmic contact layer 402 formed on the second dummy layer 409 have the same shape as the first and second dummy layers 401 and 409, respectively. Like the first and second dummy layers 401 and 409, the ohmic contact layer 402 formed on the first and second dummy layers 401 and 409 are partially discontinued at the intersections of the data line DL2 and the gate line GL2.

Referring to FIG. 5B, a semiconductor layer 403 of genuine amorphous silicon is deposited on the entire surface of the lower substrate 400 including the data line DL2, the source electrode SE2, the drain electrode DE2, the data pad electrode DP2, the first dummy layer 401 and the second dummy layer 409. Then, a gate insulating layer GI2 of silicon oxide SiOx or silicon nitride SiNx is deposited on the entire surface of the substrate 400 including the semiconductor layer 403.

Next, the gate insulating layer GI2, the semiconductor layer 403 and the ohmic contact layer 402 are selectively etched, thereby forming a drain contact hole C201, a data pad contact hole C203, a first dummy contact hole C202 and a second dummy contact hole C204 (second mask). At this time, the drain contact hole C201 exposes a predetermined portion of the drain electrode DE2, the data pad contact hole C203 exposes a predetermined portion of the data pad electrode DP2, the first dummy contact hole C202 exposes a predetermined portion of the first dummy layer 401, and the second dummy contact hole C204 exposes a predetermined portion of the second dummy layer 409.

As shown in FIG. 5C, a transparent conductive layer of ITO (Indium Tin Oxide) is deposited on the entire surface of the substrate 400 including the gate insulating layer GI2, and is patterned by photolithography, thereby forming the gate line GL2, a gate electrode GE2, a gate pad electrode GP2, a data pad terminal 404, a common electrode CE2, a common line CL2, and a pixel electrode PXL2. At this time, the gate line GL2 is formed in one direction on the gate insulating layer GI2, wherein the gate line GL2 is formed perpendicular to the data line DL2. The gate electrode GE2 is formed extending from the gate line GL2, such that the gate electrode GE2 is formed in the thin film transistor TFT2. The gate electrode GE2 is formed on the gate insulating layer GI2 and edges of the gate electrode GE overlap the predetermined portion of the source electrode SE2 and the predetermined portion of the drain electrode DE2.

Also, the gate pad electrode GP2 is formed at one end of the gate line GL2. The gate pad electrode GP2 and the gate line GL2 are connected with the first dummy layer 401 through the first dummy contact hole C202, wherein the first dummy layer 401 is formed of the same material as the data line DL2. Since the gate pad electrode GP2 is formed of the transparent conductive layer, there is no need to provide an additional gate pad terminal that connects with the gate pad electrode GP2.

Also, the common line CL2 is formed across the pixel regions P2 in a horizontal direction, and the common line CL2 is connected with the second dummy layer 409 through the second dummy contact hole C204. The data pad terminal 404 is connected with the data pad electrode DP2 through the data pad contact hole C203, and the data pad terminal 404 is formed in the same shape as the data pad electrode DP2. The pixel electrode PXL2 is formed on the gate insulating layer GI2 in the pixel region P2, wherein the pixel electrode PXL2 is connected with the drain electrode DE2 through the drain contact hole C201.

To minimize electric resistance elements of the gate line GL2, it is necessary to maximize a contact area between the gate line GL2 and the first dummy layer 401. For this, the first dummy contact hole C202 is formed at a maximum size within a permitted limit in accordance with the line width and length of the gate line GL2. In another method, as shown in FIG. 4, it is preferable to maximize the number of first dummy contact holes C202 within a permitted limit. Also, as the thickness of the first dummy layer 401 increases, it is possible to decrease the electric resistance elements of the gate line GL2.

In the same manner, to minimize electric resistance elements of the common line CL2, it is necessary to maximize a contact area between the common line CL2 and the second dummy layer 409. For this, the second dummy contact hole C204 is formed at a maximum size within a permitted limit in accordance with line width and length of the common line CL2. In a similar method as described above, it is preferable to maximize the number of second dummy contact holes C204 within a permitted limit.

In a general IPS mode LCD device, since the common electrode CE2 is formed of metal, it has a low light-transmittance ratio, thereby limiting the reduction of thickness. In the LCD device according to the second exemplary embodiment of the present invention, the pixel electrode PXL2 and the common electrode CE2 are formed of the transparent conductive layer, thus, it is possible to increase the thickness. Accordingly, as the thicknesses of the pixel electrode PXL2 and the common electrode CE2 are maximized, it is possible to decrease electric resistance elements of the pixel electrode PXL2 and the common electrode CE2. Although not shown, the lower substrate 400 is bonded to an upper substrate at a predetermined interval, and a liquid crystal layer is interposed between the lower and upper substrates. In the meantime, it is possible to change the common electrode CE2 and the pixel electrode PXL2 in shape.

Figure 6:
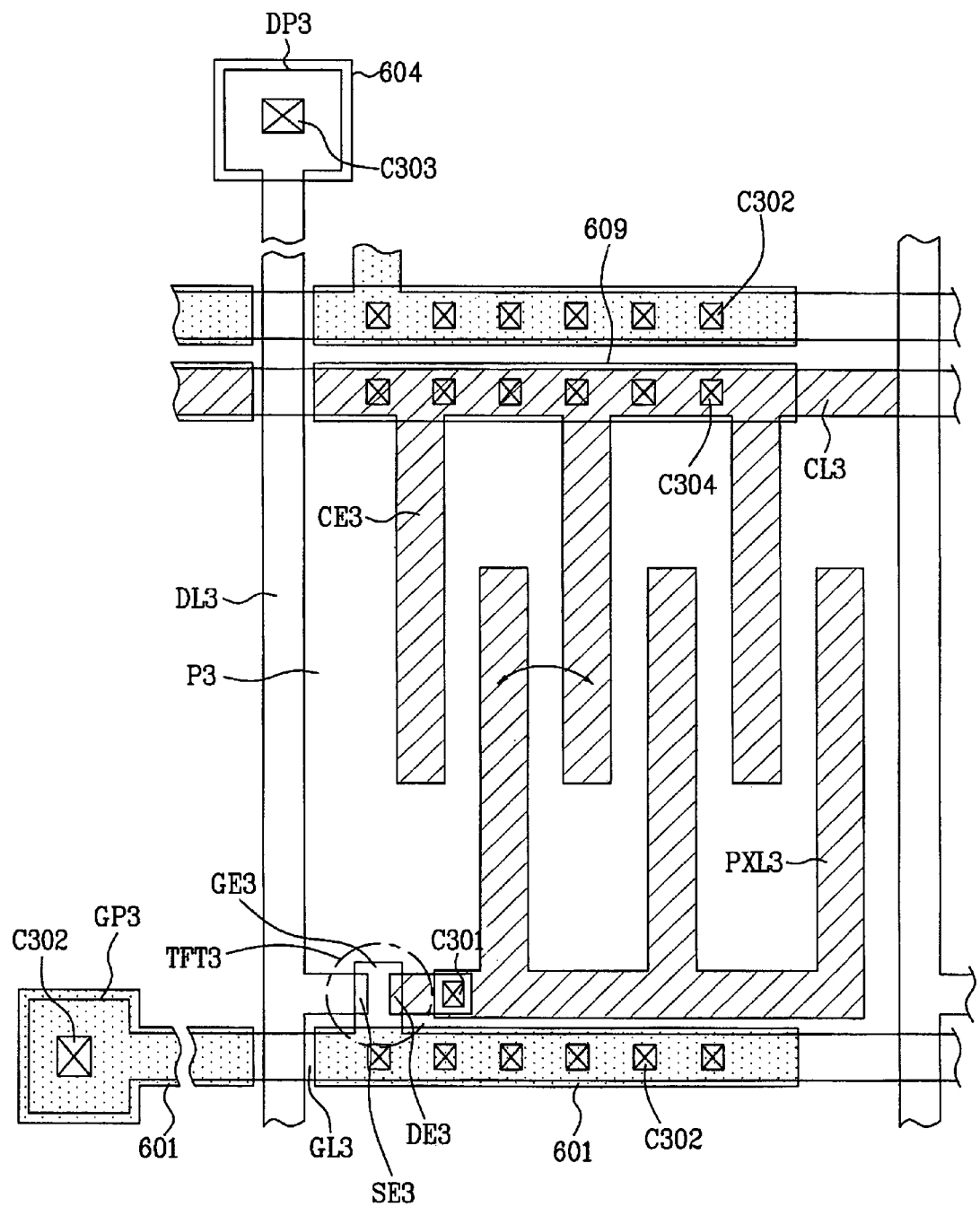
FIG. 6 is a schematic view showing a lower substrate of an LCD device according to a third exemplary embodiment of the present invention.

FIG. 6 is a schematic view showing a lower substrate of an LCD device according to the third exemplary embodiment of the present invention. The lower substrate of the LCD device according to the third exemplary embodiment of the present invention is similar in structure to a lower substrate of an LCD device according to the second exemplary embodiment of the present invention except for an orientation of the comb-shaped pixel and common electrodes.

As shown in FIG. 6, the lower substrate of the LCD device according to the third exemplary embodiment includes a plurality of gate lines GL3, a plurality of data lines DL3, and a plurality of thin film transistors TFT3. The plurality of gate lines GL3 are formed perpendicular to the plurality of data lines DL3, thereby defining a plurality of pixel regions P3 in matrix. The plurality of thin film transistors TFT3 are formed at respective intersections of the plurality of gate and data lines GL3 and DL3.

Each of the thin film transistors TFT3 includes a gate electrode GE3, source and drain electrodes SE3 and DE3, and a semiconductor layer (not shown). The gate electrode GE3 is formed extending from the gate line GL3 toward the pixel region P3, and source and drain electrodes SE3 and DE3 are formed extending from the data line DL3 toward the pixel region P3. The source and drain electrodes SE3 and DE3 are separated from each other by a gap, and portions of the source and drain electrodes SE3 and DE3 are overlapped with the edges of the gate electrode GE3.

Also, a pixel electrode PXL3 having a comb-shape is formed in the pixel region P3, wherein the pixel electrode PXL3 is formed of the same material as the gate line GL3. The teeth portions of the pixel electrode PXL3 are formed in parallel with the data line DL3. The handle portion of the comb-shaped pixel electrode PXL3 is connected with the drain electrode DE3 through a drain contact hole C301.

Similarly, a comb-shaped common electrode CE3 is formed in each pixel region P3 and the common electrode CE3 is formed of the same material as the gate line GL3. The teeth portions of the common electrode CE3 are formed at fixed intervals in a vertical direction. That is, the teeth portions of the common electrode CE3 are formed parallel to the data line DL3. Each tooth portion of the common electrode CE3 is positioned between the teeth portions of the pixel electrode PXL3. As shown FIG. 6, the common line CL3 is formed across the pixel regions P3 in a horizontal direction, that is, the common line CL3 is perpendicular to the data line DL3.

In addition, a gate pad electrode GP3 is formed at one end of the gate line GL3, wherein size of the gate pad electrode GP3 is larger than the gate line GL3. Also, a data pad electrode DP3 is formed at one end of the data line DL3, wherein size of the data pad electrode DP3 is larger than the data line DL3. Furthermore, a data pad terminal 604 is formed over the data pad electrode DP3, wherein the data pad terminal 604 is connected with the data pad electrode DP3 through a data pad contact hole C303.

To decrease the number of masks used, the gate line GL3, the pixel electrode PXL3, the common electrode CE3, and the common line CL3 are formed of the same material in the LCD device according to the third exemplary embodiment of the present invention. In this case, the material for the gate line GL3, the pixel electrode PXL3, the common electrode CE3, and the common line CL3 includes a transparent conductive material such as ITO (Indium Tin Oxide), thereby it is possible to prevent lowering of the light-transmittance ratio in the pixel region P3. While the transparent conductive layer has the great light-transmittance ratio, which is suitable for the pixel electrode PXL3, the transparent conductive layer has a higher electric resistance than a general metal material, such that the transparent conductive layer is generally unsuitable for the gate line GL3 and the common line CL3.

In the LCD device according to the third exemplary embodiment of the present invention, a first dummy layer 601 of metal material is additionally formed, wherein the first dummy layer 601 is connected with the gate line GL3 of the transparent conductive layer. Thus, it is possible to increase the thickness of the gate line GL3, thereby decreasing the electric resistance elements of the gate line GL3. Also, a second dummy layer 609 of metal material is formed, which is connected with the common line CL3 of the transparent conductive layer. Thus, it is possible to increase the thickness of the common line CL3 to decrease the electric resistance elements of the common line CL3.

To minimize electric resistance elements of the gate line GL3, it is important to maximize a contact area between the gate line GL3 and the first dummy layer 601. For this, the first dummy contact hole C302 is formed in a maximum size within a permitted limit in accordance with the line width and length of the gate line GL3. Furthermore, as shown in FIG. 6, it is preferable to maximize the number of first dummy contact holes C302 within a permitted limit. In addition, as the thickness of the first dummy layer 601 increases, it is possible to decrease the electric resistance elements of the gate line GL3.

In the same manner, to minimize electric resistance elements of the common line CL3, it is necessary to maximize a contact area between the common line CL3 and the second dummy layer 609. For this, the second dummy contact hole C304 is formed in a maximum size within a permitted limit in accordance with line width and length of the common line CL3. Moreover, it is preferable to maximize the number of second dummy contact holes C304 within a permitted limit.

In a general IPS mode LCD device, since the common electrode CE3 is formed of metal, it has a low light-transmittance ratio, thus limiting the reduction of thickness. In the LCD device according to the third exemplary embodiment of the present invention, the pixel electrode PXL3 and the common electrode CE3 are formed of the transparent conductive layer, thus, it is possible to increase the thickness. Accordingly, as the thicknesses of the pixel electrode PXL3 and the common electrode CE3 are maximized, it is possible to decrease electric resistance elements of the pixel electrode PXL3 and the common electrode CE3.

In the LCD device according to the third exemplary embodiment, an upper substrate (not shown) is provided opposite to the lower substrate, and a liquid crystal layer is interposed between the lower and upper substrates. Although not shown, the upper substrate includes a black matrix layer that prevents a light leakage from portions of the lower substrate except at the pixel regions, an R/G/B color filter layer for displaying various colors, and an overcoat layer that supports the flatness of the color filter layer and prevents the liquid crystal layer from being contaminated due to pigments of the color filter layer. In addition, the teeth of the pixel electrode PXL3 and the teeth of the common electrode CE3 are formed parallel to the data lines DL3, such that an electric field is generated in an arrow direction of FIG. 6 (circular shaped arrow sown in the center portion of the pixel region).

As described above, the LCD device and the method for fabricating the same according to the present invention have the following advantages. First, the gate line, the pixel electrode, the common electrode and the common line are all formed of the same material, thereby it is possible to decrease the number of masks used in the fabricating process. Also, by forming the first dummy layer under the gate line, which is connected with the gate line, and by forming the second dummy layer under the common line, which is connected with the common line, it is possible to decrease the electric resistance elements of the gate and common lines.

Further, it is possible to decrease the number of masks used in the fabricating process using the diffraction exposure process of the related art, thereby preventing the decrease of etching uniformity when removing the metal and the impurity semiconductor layers from the channel region.

It will be apparent to those skilled in the art that various modifications and variations can be made in the liquid crystal display device and method for fabricating the same of the present invention without departing from the spirit or scope of the invention. Thus, it is intended that the present invention covers the modifications and variations of this invention provided they come within the scope of the appended claims and their equivalents.

What is claimed is:

1. An LCD device, comprising:
a data line, a dummy layer, and source and drain electrodes formed on a substrate;
an ohmic contact layer formed on the data line, the dummy layer, and the source and drain electrodes;
a semiconductor layer and a gate insulating layer formed on the substrate;
a plurality of contact holes formed through the ohmic contact layer, the semiconductor layer, and the gate insulating layer, wherein at least one contact hole exposes the drain electrode;
a gate line formed on the gate insulating layer perpendicular to the data line;
a gate electrode formed extending from the gate line, wherein the gate electrode is positioned between the source electrode and the drain electrode;
pixel regions defined by intersections of the gate lines and the data lines; and
a pixel electrode connected with the drain electrode through another contact hole in the pixel region, wherein the pixel electrode is formed of a same material as the gate line.

2. The LCD device of claim 1, wherein the gate line, the gate electrode and the pixel electrode are formed of a transparent conductive material.

3. The LCD device of claim 1, wherein the data line, the dummy layer, the source electrode and the drain electrode are formed of a metal material having high electric conductivity.

4. The LCD device of claim 1, wherein the dummy layer is disposed under the gate line and is electrically connected with the gate line.

5. The LCD device of claim 1, wherein the dummy layer is electrically insulated from the data line by forming a disconnected portion at intersections of the gate lines and the data lines.

6. The LCD device of claim 1, further comprising:
a gate pad electrode formed at one end of the gate line; and
a data pad electrode formed at one end of the data line.

7. The LCD device of claim 5, further comprising:
a gate pad terminal formed on the gate pad electrode and being electrically connected with the gate pad electrode; and
a data pad terminal formed on the data pad electrode and being electrically connected with the data pad electrode.

8. An LCD device, comprising:
a data line, first dummy layer, second dummy layer, and source and drain electrodes formed on a substrate;
an ohmic contact layer formed on the data line, the first dummy layer, the second dummy layer, and the source and drain electrodes;
a semiconductor layer and a gate insulating layer formed on the substrate;
a plurality of contact holes formed through the ohmic contact layer, semiconductor layer, and the gate insulating layer, wherein at least one contact hole exposes the drain electrode;
a gate line formed on the gate insulating layer perpendicular to the data line;
a gate electrode formed extending from the gate line, wherein the gate electrode is positioned between the source electrode and the drain electrode;

pixel regions defined by intersections of the gate lines and the date lines;

a pixel electrode formed of a same material as the gate line in the pixel region, the pixel electrode being electrically connected with the drain electrode through another contact hole, wherein the pixel electrode has a first portion and a plurality of second portions;

a common line formed of the same material as the gate line;

a common electrode formed of the same material as the gate line in the pixel region, wherein the common electrode has a plurality of second portions such that one second portion of the common electrode is positioned next to one second portion of the pixel electrode.

9. The LCD device of claim 8, wherein the gate line, the gate electrode, the pixel electrode and the common electrode are formed of a transparent conductive material.

10. The LCD device of claim 8, wherein the first dummy layer and the second dummy layer are formed of a same material as the data line.

11. The LCD device of claim 10, wherein the first dummy layer is disposed under the gate line and is electrically connected with the gate line, and the second dummy layer is disposed under the common line and is electrically connected with the common line.

12. The LCD device of claim 8, wherein the data line, the first dummy layer, the second dummy layer, and the source and drain electrodes are formed of a metal material having the great electric conductivity.

13. The LCD device of claim 11, wherein the first dummy layer is electrically insulated from the data line by forming a disconnected portion at intersections of the gate line and the data line.

14. The LCD device of claim 11, wherein the second dummy layer is electrically insulated from the data line by forming a disconnected portion at intersections of the gate line and the data line.

15. The LCD device of claim 8, wherein the second portions of the common electrode is formed extending from the common line, such that the common line is formed parallel to the gate line across the pixel regions.

16. The LCD device of claim 8, further comprising:
a gate pad electrode formed at one end of the gate line; and
a data pad electrode formed at one end of the data line.

17. The LCD device of claim 16, further comprising:
a gate pad terminal formed on the gate pad electrode and connected electrically with the gate pad electrode; and
a data pad terminal formed on the data pad electrode and connected electrically with the data pad electrode.

18. A method for fabricating an LCD device comprising:
forming a data line, a dummy layer, and source and drain electrodes on a substrate;
forming an ohmic contact layer on the data line, the dummy layer, and the source and drain electrode;
sequentially depositing a semiconductor layer and a gate insulating layer on an entire surface of the substrate including the source and drain electrodes, dummy layer, and the data line;
forming a plurality of contact holes through the ohmic contact layer, the semiconductor layer, and the gate insulating layer, wherein a first contact hole exposes the drain electrode and at least one second contact hole exposes the dummy layer;
forming a gate line on the gate insulating layer perpendicular to the data line, wherein a gate electrode is formed extending from the gate line and the gate line is electrically connected with the dummy layer through the at least one second contact hole; and
forming a pixel electrode which connects with the drain electrode through the first contact hole, wherein the pixel electrode is formed of a same material as the gate line.

19. The method of claim 18, wherein the gate line, the gate electrode and the pixel electrode are formed of a transparent conductive material.

20. The method of claim 18, wherein the source and drain electrodes, the data line, and the dummy layer are formed of a same material.

21. The method of claim 20, wherein the data line, the dummy layer, and the source and drain electrodes are formed of a metal material having high electric conductivity.

22. A method for fabricating an LCD device comprising:
forming source and drain electrodes, a data line, and first and second dummy layers on a substrate;
forming an ohmic contact layer on the data line, the source and drain electrodes, and the first and second dummy layers;
sequentially forming a semiconductor layer and a gate insulating layer on an entire surface of the substrate including the source and drain electrodes, the data line and the first and second dummy layers;
forming a plurality of contact holes through the ohmic contact layer, the semiconductor layer, and the gate insulating layer, wherein first contact hole exposing the drain electrode, and at least one second contact hole exposing the first dummy layer and another second hole exposes the second dummy layer;
forming a gate line on the gate insulating layer perpendicular to the data line, wherein a gate electrode is formed extending from the gate line and the gate line is electrically connected with the first dummy layer through the at least one second contact hole;
forming a pixel electrode having a first portion and a plurality of second portions, the pixel electrode connected with the drain electrode through the first contact hole, and the pixel electrode is formed of a same material as the gate line;
forming a common electrode having a plurality of second portions, the common electrode formed of the same material as the gate line, wherein one second portion of the common electrode is positioned next to one second portion of the pixel electrodes; and
forming a common line which is electrically connected with the second dummy layer through another second contact hole to apply a common voltage to the common electrode.

23. The method of claim 22, wherein the gate line, the gate electrode, the pixel electrode, the common electrode and the common line are formed of a transparent conductive material.

24. The method of claim 22, wherein the source and drain electrodes, the data line and the first and second dummy layers are formed of a same material.

25. The method of claim 24, wherein the data line, the source and drain electrodes and the first and second dummy layers are formed of a metal material having high electric conductivity.

* * * * *